Feb. 1, 1938.　　　　J. F. NIELSEN　　　　2,106,957
CHANGE-OVER FOR SOUND PICTURE APPARATUS
Filed Jan. 27, 1934　　　2 Sheets-Sheet 1
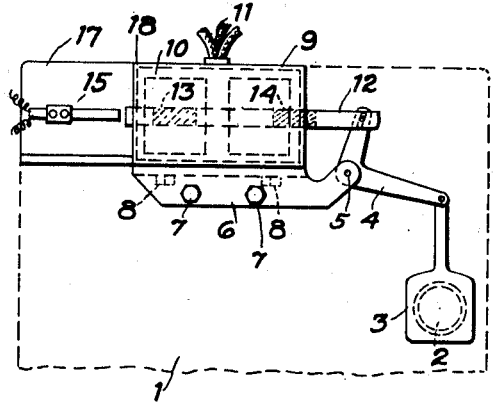
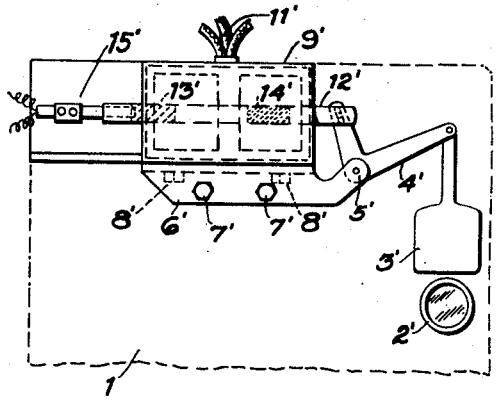
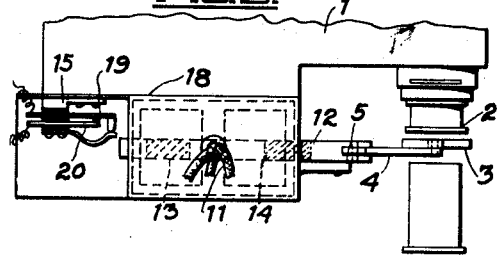
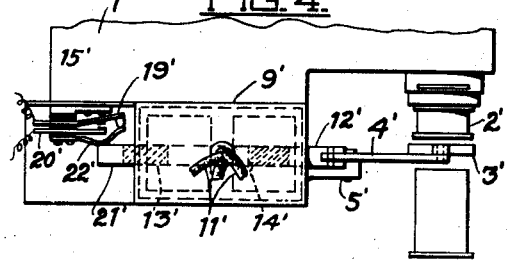
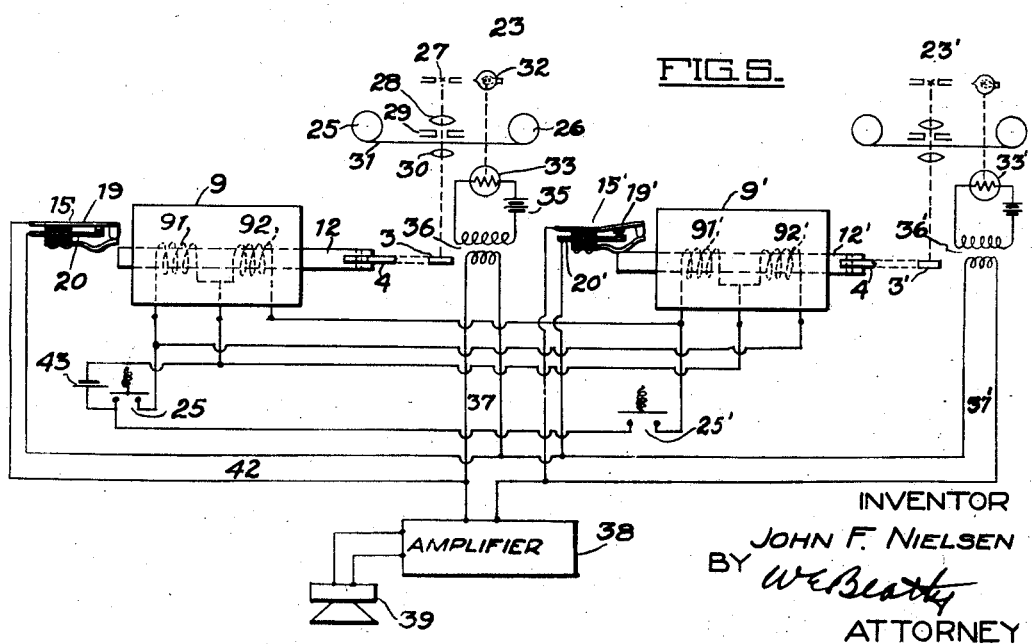
INVENTOR
JOHN F. NIELSEN
BY W. E. Beatty
ATTORNEY Feb. 1, 1938. J. F. NIELSEN 2,106,957
CHANGE-OVER FOR SOUND PICTURE APPARATUS
Filed Jan. 27, 1934   2 Sheets-Sheet 2
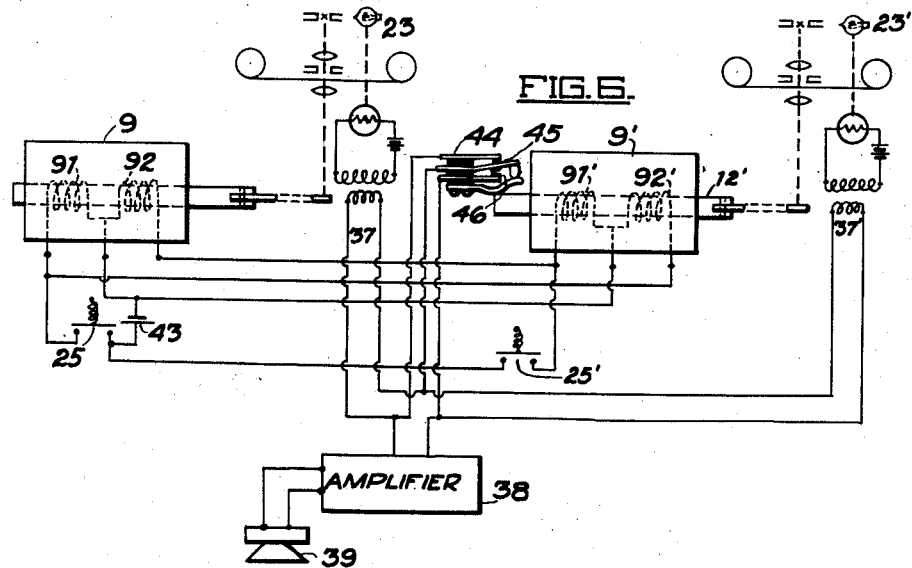
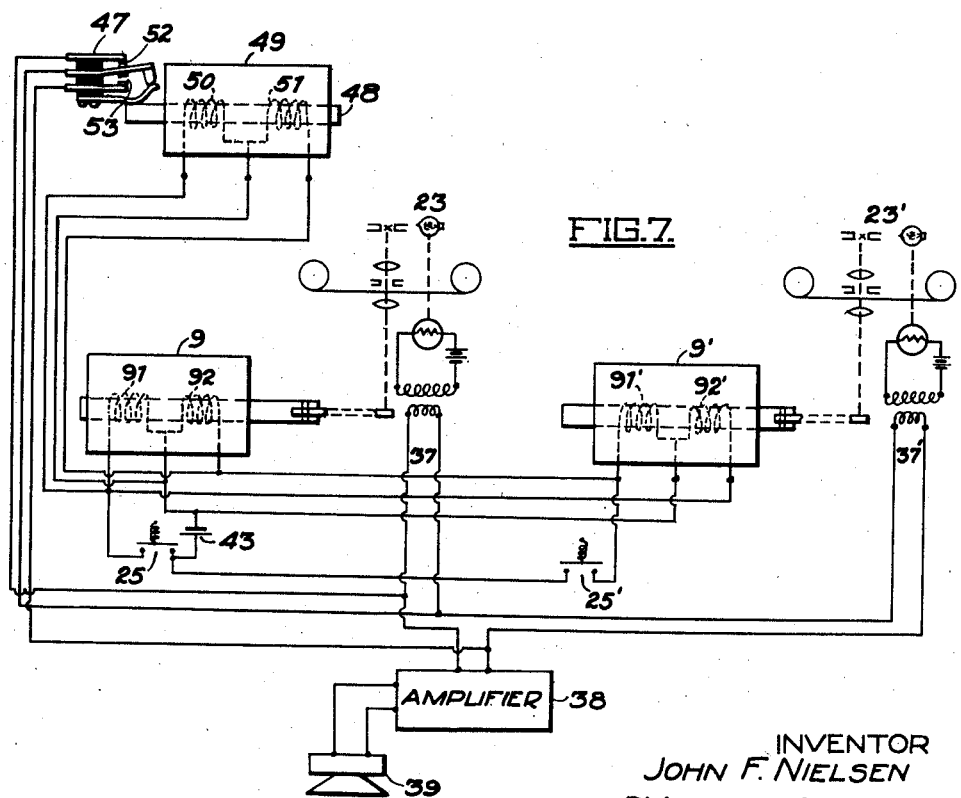
INVENTOR
JOHN F. NIELSEN
BY W. E. Beatty
ATTORNEY Patented Feb. 1, 1938

2,106,957

UNITED STATES PATENT OFFICE 2,106,957

CHANGE-OVER FOR SOUND PICTURE APPARATUS

John F. Nielsen, Corona, Long Island, N. Y., assignor to United Research Corporation, Long Island City, N. Y., a corporation of Delaware Application January 27, 1934, Serial No. 708,553

3 Claims. (Cl. 88—16.2)

The invention relates to talking picture apparatus wherein use is made of a plurality of sound picture machines which are brought into operation in succession in order to present to an audience a continuous performance from a plurality of sound and picture records.

It has heretofore been proposed to employ a potentiometer, popularly known as a fader, to shift the sound reproduction from one sound head to another, in combination with a separate device for fading the picture beam from one projector to another.

The objects of the present invention are to avoid the use of a potentiometer or fader in the sound circuits and to automatically effect the sound changeover simultaneously with the picture changeover, in a simple effective manner, without betraying the changeover to the audience.

These objects are accomplished in a simple manner by taking advantage of the fact that if the sound changeover is made at the proper instant, the audience cannot detect the changeover even though it is made instantaneously instead of gradually, as heretofore proposed. The invention provides switching means movable to alternate positions for effecting the sound and the picture changeover from each of two sound picture machines to the other.

The invention is illustrated in connection with a picture changeover now available on the market, although any other type of changeover may be used. The changeover embodied in this invention comprises a solenoid-operated shutter for each picture projector, the shutter being operated by one coil to cover the picture aperture of the projector and being operated by another coil to permit the projected beam of light to reach the screen. The solenoids for two machines are simultaneously operated in opposite senses to shift from one picture projector to another. In order to effect a changeover of the sound-reproducing apparatus simultaneously with the picture changeover, the invention provides a circuit arrangement operated by the picture changeover to simultaneously effect the changeover of the sound-reproducing apparatus.

For further details of the invention reference may be made to the drawings wherein Fig. 1 is a view in elevation of one unit of a sound and picture changeover mechanism according to the invention.

Fig. 2 is a view of the unit of Fig. 1 with the operating mechanism in its alternate position or a view of a second unit cooperating with the first unit.

Fig. 3 is a plan view corresponding to Fig. 1.
Fig. 4 is a plan view corresponding to Fig. 2.
Fig. 5 is a schematic circuit for the apparatus of Figs. 1 to 4.

Fig. 6 is a modification of Fig. 5, with the switches 19 and 19' thereof combined into a unitary switching device.

Fig. 7 is a modification of Fig. 6 wherein the solenoid-operated switching device is separate from the sound and picture changeover.

Referring in detail to the drawings, the sound and picture projector 1 of Figs. 1 and 2 is provided with film supply and take-up reels for motion picture film having a sound track at one side thereof, and with suitable sprockets and pull-down mechanism not illustrated and well understood in the art. The picture beam is projected through the usual projection apparatus to which is attached lens tube 2 closed by a shutter 3 suspended from a bell crank lever 4. This lever 4 is pivotally supported at 5 by the bracket 6 which is suitably fastened by means such as bolts 7 to the front wall of projector 1. Supported on bracket 6, and fastened thereto by means such as bolts 8 is a solenoid 9 comprising a magnetic field structure 10 enclosing two hollow field windings 91, and 92 connected as shown in Fig. 5 and the terminals of which are shown at 11 in Fig. 1. The plunger 12 is located centrally within field structure 10 and its windings, and it comprises two soft iron armatures 13 and 14 which are alternately acted upon when current is supplied to terminals 11 to attract the plunger 12 to the alternate positions shown in Figs. 2 and 4 where the corresponding parts are indicated by corresponding primed reference numbers.

In order to effect the sound changeover simultaneously with the picture changeover, the switch 15 is arranged to control the sound circuit in response to the actuation of plunger 12. The switch 15 is mounted on a vertical plate 17 which extends from and is suitably fastened to the casing 18 of the solenoid 9.

When coil 91 is deenergized and coil 92 energized, the plunger 12 is moved to the position shown in Figs. 1 and 3 to drop shutter 3, and the contacts 19 and 20 of switch 15 are closed. When the solenoid 91 is energized and 92 is deenergized, the shutter 3 is raised as shown in Figs. 2 and 4, the end 21' of plunger 12' actuating the spring clip 22' which lies in its path, to raise the contact 19' away from contact 20' to thereby open the circuit connected to these contacts.

Referring to Fig. 5, two sound picture machines 23 and 23' are illustrated with a single hand or foot operated switch 25 to simultaneously effect sound and picture changeover in one sense through the instrumentality of the apparatus shown in Figs. 1 to 4, and a single hand or foot operated switch 25' to changeover in the alternate sense.

The talking motion picture machine 23 is illustrated as comprising film supply and take-up reels 25 and 26 for sound on film 31, with the light source 27, condenser lens 28, picture gate 29, and focusing lens 30, for projecting the picture along an optical axis intercepted at times by shutter 3. The sound track on film 31 is reproduced by light source 32 and light sensitive cell 33. The parts just described are also present in the alternate machine 23' which is provided with a light sensitive cell 33'. Cell 33 is provided with a source of polarizing current 35 and is coupled through transformer 36 to the line 37 which leads by way of switch 15 or 15' through amplifier 38 to the loud speaker 39. Cell 33' is similarly coupled through transformer 36' to line 37', the lines 37 and 37' being connected in series relation to the amplifier 38.

Between transformer 36 and amplifier 38, a shunt circuit 42 across the line 37 is taken to the contacts 19 and 20, and in the position shown in Fig. 5 the line 37 is short circuited by these contacts 19 and 20 to prevent sound reproduction from machine 23 and to permit reproduction from machine 23' where the contacts 19' and 20' therefor are open. At this time, shutter 3 is in the position shown in Fig. 1, and shutter 3' is in the position shown in Fig. 2. The contacts 19' and 20' for machine 23' are connected in shunt to line 37', in the same way that the same contacts for the alternate machine 23 are connected. The coils 91, 92, also 91', and 92' are supplied with current from battery 43 under control of the switches 25 and 25' which are preferably arranged adjacent their respective machines and foot-operated. When the switch 25 is closed, the opening coil 91 of one machine, and the closing coil 92' of the alternate machine are simultaneously energized to move the sound and picture changeover mechanism to positions alternate to that shown in Fig. 5, and switch 25' when closed energizing the closing coil 92 of changeover 9 and the opening coil 91' of changeover 9' simultaneously to move the changeover mechanism to the position shown in Fig. 5.

Assuming machine 23 to be idle and machine 23' to be running, when the end of the reel on machine 23' is approached, at a prearranged cue taken from the picture projected by machine 23', the machine 23 is started into operation. After a short interval, the switch 25 is operated to start sound and picture reproduction from machine 23, so that the subsequent reel of a series may be supplied to machine 23' which is made ready to begin operation by closing switch 25' when the end of the reel for machine 23 is reached.

Instead of employing two switching devices 15 and 15' as shown in Fig. 5, these two switches may be consolidated into a unitary switching device 44 as shown in Fig. 6. The top pair of contacts 45 are connected in circuit the same way as contacts 19 and 20 of Fig. 5, and the bottom contacts 46 are connected the same way as contacts 19' and 20' of Fig. 5. The contacts of the switch 44 are actuated by a plunger 12' as described in connection with Fig. 5.

Referring to Fig. 7, a switching device 47, like 44 in Fig. 6, may be actuated by the plunger 48 of a solenoid 49, the plunger 8 serving merely to actuate the switch 47 instead of being employed to operate the shutter of the picture changeover. The coil 50 of solenoid 49 is connected in parallel with the opening coil 91 and with the closing coil 92' and is actuated simultaneously therewith under control of switch 25 to operate switch 47 to the position shown wherein the top pair of contacts 52 short circuit the line 37'. Similarly the coil 51 of solenoid 49 is connected in parallel with the closing coil 92 and with the opening coil 91' under control of switch 25' to be simultaneously energized thereby whereupon the plunger 48 is actuated to its alternate position to open contacts 53. Therefore, sound and picture changeover is effected in Fig. 7 by means of switching mechanism 47, 49 which is separate and distinct from, but which is actuated contemporaneously with, the picture changeovers 9 and 9'.

It will be apparent that various modifications may be made in the arrangement above described. For example, the contacts operated by plunger 12 and 12' instead of short circuiting a series arrangement of sound heads as shown in Fig. 5, can open circuit a parallel connection of the sound heads as will be obvious. Also any other picture shutter device than that shown herein may be used for the purpose of effecting the sound changeover.

I claim:

1. The combination of a plurality of talking motion picture machines, a switch for each thereof, means under control of said switches for changing over picture reproduction from one of said machines to another, and means under control of said switches for changing over sound reproduction in like manner from one of said machines to another, said last mentioned means comprising a solenoid, a reciprocating plunger therefor, three aligned contacts adjacent one end of said plunger, means adapted to be engaged by said end of said plunger and adapted to be disengaged therefrom for alternately operating said contacts in pairs, and circuit connections between said pairs of contacts and the sound reproducing circuits of said machines respectively.

2. Sound and picture changeover apparatus comprising a motion picture projector, a picture changeover therefor having a coil operated plunger, film sound record reproducing means associated therewith comprising a light sensitive cell, an amplifier, a loud speaker connected to said amplifier, a transformer for coupling said cell to said amplifier, a second motion picture projector, a second picture changeover therefor having a coil operated plunger and film sound record reproducing means associated with said second projector and comprising a second light sensitive cell, and a second transformer for coupling said second cell to said amplifier, a pair of contacts for each of said plungers and arranged in shunt with each of said transformers, and means for alternately energizing said coils to operate said plungers and their respective contacts to instantaneously switch sound and picture reproduction from one of said sound and picture reproducing means to the other thereof.

3. Sound and picture changeover apparatus comprising a motion picture projector having a light blocking mechanism adapted to be removed and replaced, film sound record reproducing means associated with said projector comprising a light sensitive cell, an amplifier, a transformer for coupling said cell to said amplifier, a loud speaker connected to said amplifier, a second motion picture projector having a second light blocking system adapted to be removed and replaced, a second film sound record reproducing means associated with said second projector comprising a second light sensitive cell, and a second transformer for coupling said second cell to said amplifier, electrical contacts in shunt with each of said transformers, means for alternately operating said contacts and said blocking mechanism to instantaneously switch sound and picture reproduction from one of said sound and picture reproducing means to the other thereof, said means including independent electrically actuating means for each light blocking mechanism and respective sound contacts, and means for actuating both of said electrical means simultaneously for simultaneously actuating said light blocking mechanisms and contacts for each of said picture projectors.

JOHN F. NIELSEN.